(12) United States Patent
Lee et al.

(10) Patent No.: US 9,779,165 B2
(45) Date of Patent: Oct. 3, 2017

(54) MOBILE TERMINAL CONTROLLING METHOD THEREOF, AND RECORDING MEDIUM THEREOF

(75) Inventors: Kunwoo Lee, Seoul (KR); Eunju Lee, Seoul (KR); Kwanju Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 891 days.

(21) Appl. No.: 13/615,535

(22) Filed: Sep. 13, 2012

(65) Prior Publication Data

US 2013/0174039 A1 Jul. 4, 2013

(30) Foreign Application Priority Data

Dec. 28, 2011 (KR) .......................... 10-2011-0144738

(51) Int. Cl.
*G06F 3/048* (2013.01)
*G06F 17/30* (2006.01)
(Continued)

(52) U.S. Cl.
CPC ...... *G06F 17/30852* (2013.01); *G06F 3/0488* (2013.01); *G06F 3/04847* (2013.01);
(Continued)

(58) Field of Classification Search
CPC ....................................................... G06F 3/048
See application file for complete search history.

(56) References Cited

U.S. PATENT DOCUMENTS

| 2008/0165141 A1* | 7/2008 | Christie ................. G06F 3/044 345/173 |
| 2010/0081475 A1* | 4/2010 | Chiang ................ G06F 3/0483 455/564 |

(Continued)

FOREIGN PATENT DOCUMENTS

| CN | 101212664 | 7/2008 |
| CN | 101217638 | 7/2008 |

(Continued)

OTHER PUBLICATIONS

The State Intellectual Property Office of the People's Republic of China Application Serial No. 201210572766.8, Office Action dated Aug. 5, 2014, 9 pages.

(Continued)

*Primary Examiner* — Andrey Belousov
*Assistant Examiner* — Seth A Silverman
(74) *Attorney, Agent, or Firm* — Lee, Hong, Degerman, Kang & Waimey PC

(57) ABSTRACT

A mobile terminal, controlling method thereof and recording medium thereof are disclosed, by which video contents can be efficiently edited. The present invention includes a touchscreen configured to display a video content and a controller controlling a progress bar for the video content to be displayed on the touchscreen, the controller controlling a $1^{st}$ time indicator and a $2^{nd}$ time indicator to be displayed on the progress bar, the controller controlling a $1^{st}$ scene at a $1^{st}$ time corresponding to the $1^{st}$ time indicator and a $2^{nd}$ scene at a $2^{nd}$ time corresponding to the $2^{nd}$ time indicator to be displayed on the touchscreen.

16 Claims, 17 Drawing Sheets

(51) Int. Cl.
  *G11B 27/034* (2006.01)
  *G06F 3/0484* (2013.01)
  *G11B 27/34* (2006.01)
  *G06F 3/0488* (2013.01)

(52) U.S. Cl.
  CPC ............ *G11B 27/034* (2013.01); *G11B 27/34* (2013.01); *G06F 2203/04808* (2013.01)

(56) References Cited

U.S. PATENT DOCUMENTS

| | | | |
|---|---|---|---|
| 2010/0107126 A1* | 4/2010 | Lin et al. .................... | 715/838 |
| 2010/0231536 A1* | 9/2010 | Chaudhri .............. | G06F 3/0481 |
| | | | 345/173 |
| 2010/0281367 A1 | 11/2010 | Langmacher et al. | |
| 2011/0167347 A1 | 7/2011 | Joo et al. | |
| 2011/0205171 A1* | 8/2011 | Akiyoshi ............ | G06F 3/04883 |
| | | | 345/173 |
| 2012/0134641 A1* | 5/2012 | Kanbe ........................ | 386/230 |
| 2012/0166950 A1* | 6/2012 | Frumar et al. ............... | 715/719 |
| 2012/0210223 A1* | 8/2012 | Eppolito .................. | H04S 7/40 |
| | | | 715/716 |
| 2012/0308209 A1* | 12/2012 | Zaletel ................. | G11B 27/034 |
| | | | 386/278 |
| 2013/0290845 A1* | 10/2013 | Rudman .............. | G11B 27/034 |
| | | | 715/716 |

FOREIGN PATENT DOCUMENTS

| | | |
|---|---|---|
| EP | 1780724 | 5/2007 |
| EP | 2672686 | 12/2013 |

OTHER PUBLICATIONS

European Patent Office Application Serial No. 12007274.9, Search Report dated Jan. 11, 2017, 9 pages.

* cited by examiner

FIG. 16
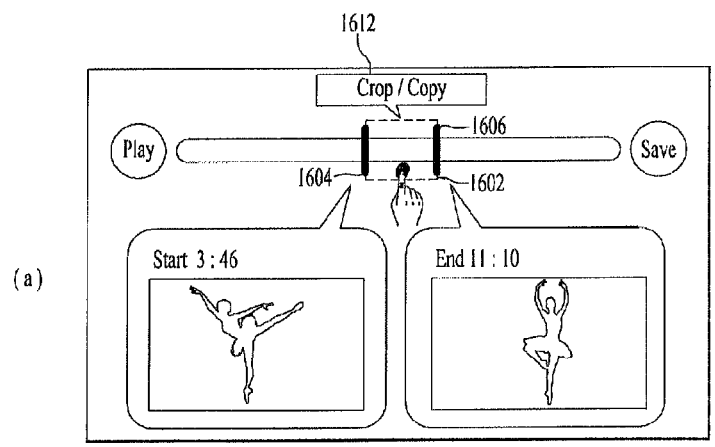
(a)
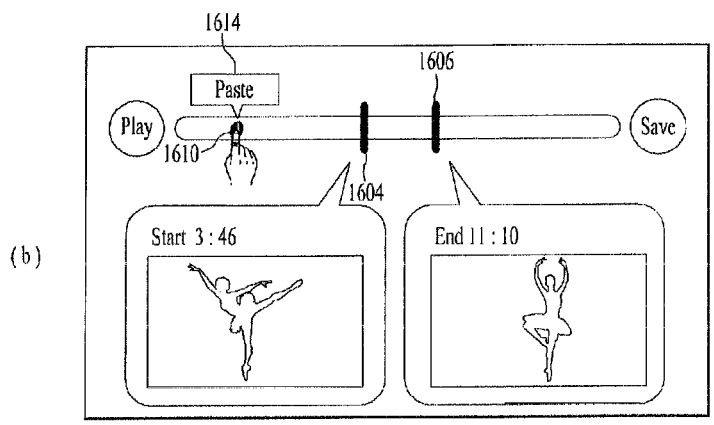
(b)

MOBILE TERMINAL CONTROLLING METHOD THEREOF, AND RECORDING MEDIUM THEREOF

Pursuant to 35 U.S.C. §119(a), this application claims the benefit of earlier filing date and right of priority to Korean Application No. 10-2011-0144738, filed on Dec. 28, 2011, the contents of which are hereby incorporated by reference herein in their entirety.

BACKGROUND OF THE INVENTION

Field of the Invention

The present invention relates to a mobile terminal, and more particularly, to a mobile terminal, controlling method thereof and recording medium thereof. Although the present invention is suitable for a wide scope of applications, it is particularly suitable for editing a video content.

Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

As the multimedia function of a mobile terminal keeps being enhanced, the demand for a video content editing tool drivable in the mobile terminal is rising. Various kinds of video content editing tools released to cope with such trend provide a function of pasting a plurality of video contents together or a function of deleting a prescribed portion of a video. However, in case of attempting to delete a prescribed portion of a video, a user has difficulty in grasping start and end points of the video to delete at a glance for lack of user's convenience.

SUMMARY OF THE INVENTION

Accordingly, the present invention is directed to a mobile terminal, controlling method thereof and recording medium thereof that substantially obviate one or more problems due to limitations and disadvantages of the related art.

An object of the present invention is to provide a mobile terminal, controlling method thereof and recording medium thereof, by which video contents can be efficiently edited.

Another object of the present invention is to provide a mobile terminal, controlling method thereof and recording medium thereof, by which both start and end points of a video can be simultaneously provided to a user.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to display a video content and a controller controlling a progress bar for the video content to be displayed on the touchscreen, the controller controlling a $1^{st}$ time indicator and a $2^{nd}$ time indicator to be displayed on the progress bar, the controller controlling a $1^{st}$ scene at a $1^{st}$ time corresponding to the $1^{st}$ time indicator and a $2^{nd}$ scene at a $2^{nd}$ time corresponding to the $2^{nd}$ time indicator to be displayed on the touchscreen.

In another aspect of the present invention, a method of controlling a mobile terminal includes the steps of displaying a progress bar, a $1^{st}$ time indicator moving on the progress bar, a $2^{nd}$ time indicator moving on the progress bar, a $1^{st}$ scene at a $1^{st}$ time corresponding to the $1^{st}$ time indicator and a $2^{nd}$ scene at a $2^{nd}$ time corresponding to the $2^{nd}$ time indicator on a touchscreen, detecting a motion of a pointer on at least one of $1^{st}$ and $2^{nd}$ regions of the touchscreen, and if the pointer is touched & dragged on the $1^{st}/2^{nd}$ region, moving the $1^{st}/2^{nd}$ time indicator.

In a further aspect of the present invention, a computer-readable recording medium includes a mobile terminal controlling method recorded therein, the mobile terminal controlling method including a command for displaying a progress bar, a $1^{st}$ time indicator moving on the progress bar, a $2^{nd}$ time indicator moving on the progress bar, a $1^{st}$ scene at a $1^{st}$ time corresponding to the $1^{st}$ time indicator and a $2^{nd}$ scene at a $2^{nd}$ time corresponding to the $2^{nd}$ time indicator on a touchscreen, a command for detecting a motion of a pointer on at least one of $1^{st}$ and $2^{nd}$ regions of the touchscreen, and a command for if the pointer is touched & dragged on the $1^{st}/2^{nd}$ region, moving the $1^{st}/2^{nd}$ time indicator.

Accordingly, the present invention provides the following effects and/or advantages.

First of all, a mobile terminal according to at least one embodiment of the present invention enables a video content to be effectively edited.

Secondly, a mobile terminal according to at least one embodiment of the present invention provides both start and end points of an edited video to a user simultaneously, thereby providing the user with convenience in editing the video.

Effects obtainable from the present invention are non-limited the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 16 is a diagram for screen configurations to show that a video between a $1^{st}$ time and a $2^{nd}$ time is inserted in a desired position.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
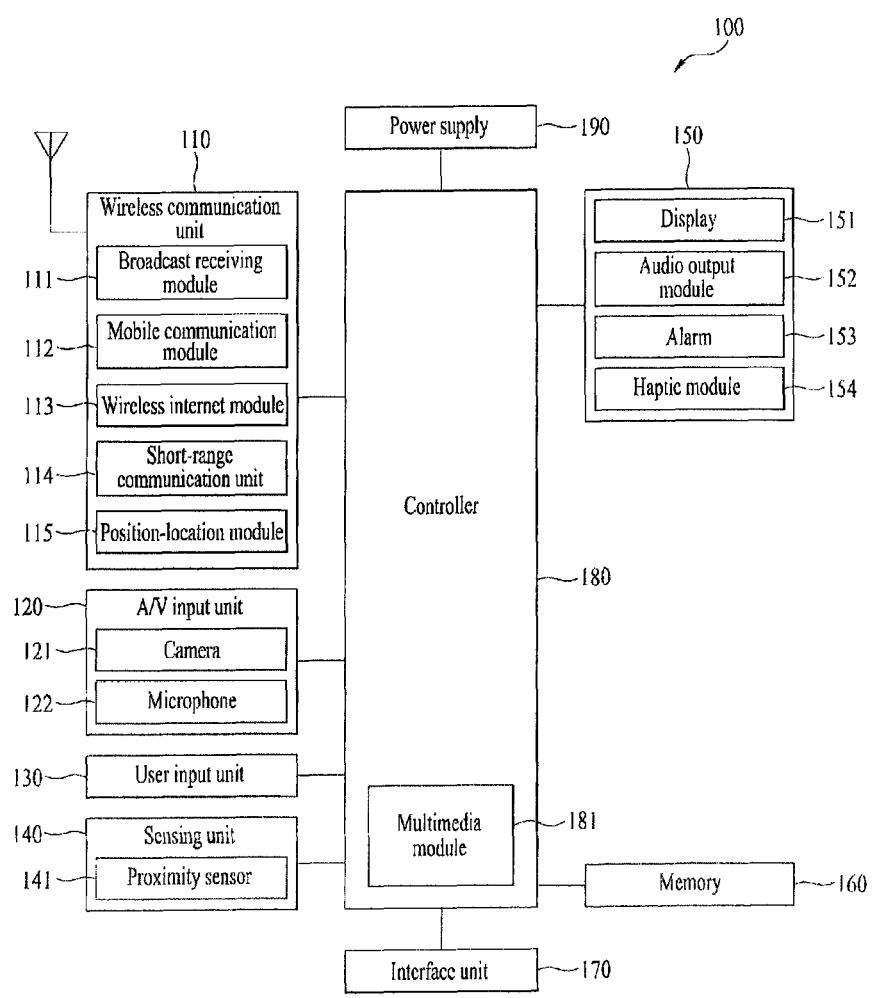
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
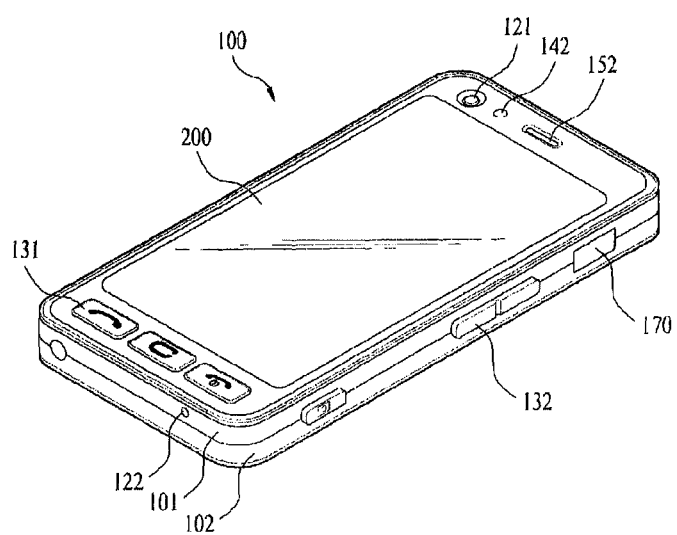
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

For clarity and convenience of the following description, a mobile terminal mentioned in the following description is assumed as including at least one of the components shown in FIG. 1. Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

In particular, a mobile terminal 100 according to the present invention may include a display (151), a memory 160 and a controller 180. The present invention could be easily perform if the display (151) is touchscreen. Hereinafter, the display may be assumed as a touchscreen. The touchscreen displays a video content and may receive various user commands for video content playback, video content editing and the like via pointer(s).

The controller 180 controls a progress bar for a video content to be displayed on the touchscreen and may control a $1^{st}$ time indicator and a $2^{nd}$ time indicator to be displayed on the progress bar. And, the controller 180 may control a $1^{st}$ scene at a $1^{st}$ time corresponding to the $1^{st}$ time indicator and a $2^{nd}$ scene at a $2^{nd}$ time corresponding to the $2^{nd}$ time indicator to be displayed on the touchscreen as well.

A video content of the present invention may include a video content saved in the memory 160 of the mobile terminal or a video contents saved in a remote terminal.

In the following description, the assembly relation of the respective components of the mobile terminal is explained in detail based on a flowchart for controlling the mobile terminal.

Figure 3:
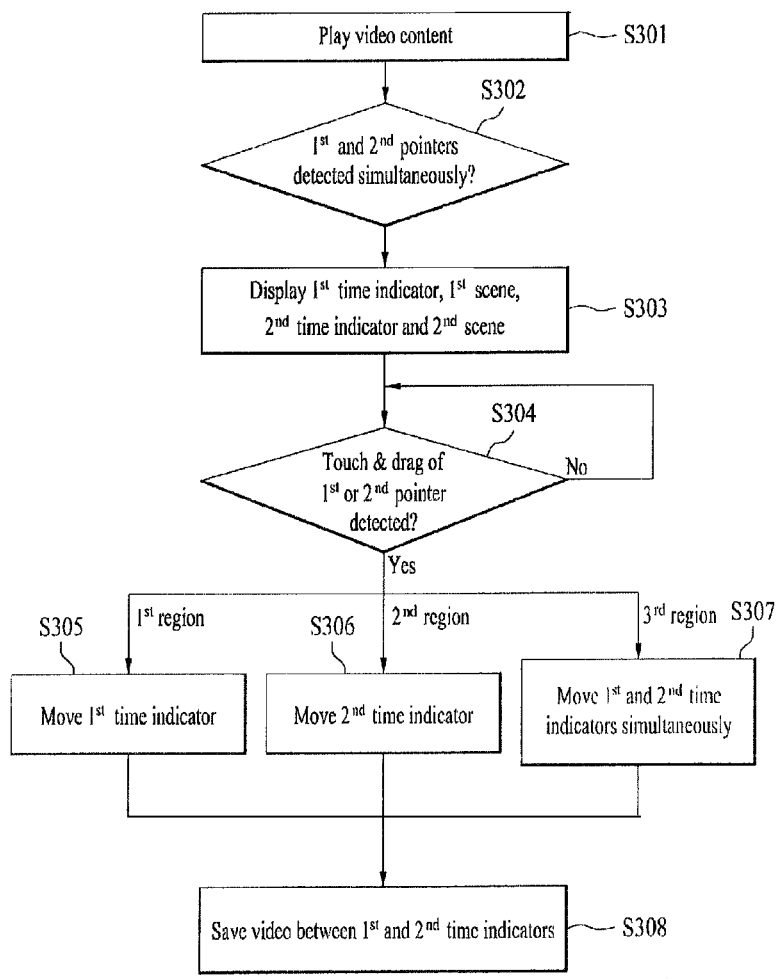
FIG. 3 is a flowchart for a method of controlling a mobile terminal according to one embodiment of the present invention.

FIG. 3 is a flowchart for a method of controlling a mobile terminal according to one embodiment of the present invention.

Referring to FIG. 3, in a video content playing step S301, the controller 180 plays a video content based on a user input and control the touchscreen to display the video content. In particular, the controller 180 plays a video content saved in the memory 160. Alternatively, the controller 180 receives a video content saved in a remote terminal via the wireless communication unit 110 and may then perform a streaming play on the received video content.

While the video content is being played back, if both $1^{st}$ and $2^{nd}$ pointers are simultaneously touched on the touchscreen [S302], the controller 180 stops playing the video content and may then enter a video editing mode.

If the video editing mode is entered, the controller 180 may be able to control a progress bar for the video content and $1^{st}$ and $2^{nd}$ time indicators, which are configured to move on the progress bar, to be displayed on the touchscreen together. Furthermore, the controller 180 may control a $1^{st}$ scene at a $1^{st}$ time corresponding to the $1^{st}$ time indicator and a $2^{nd}$ scene at a $2^{nd}$ time corresponding to the $2^{nd}$ time indicator to be displayed on the touchscreen as well.

Figure 4:
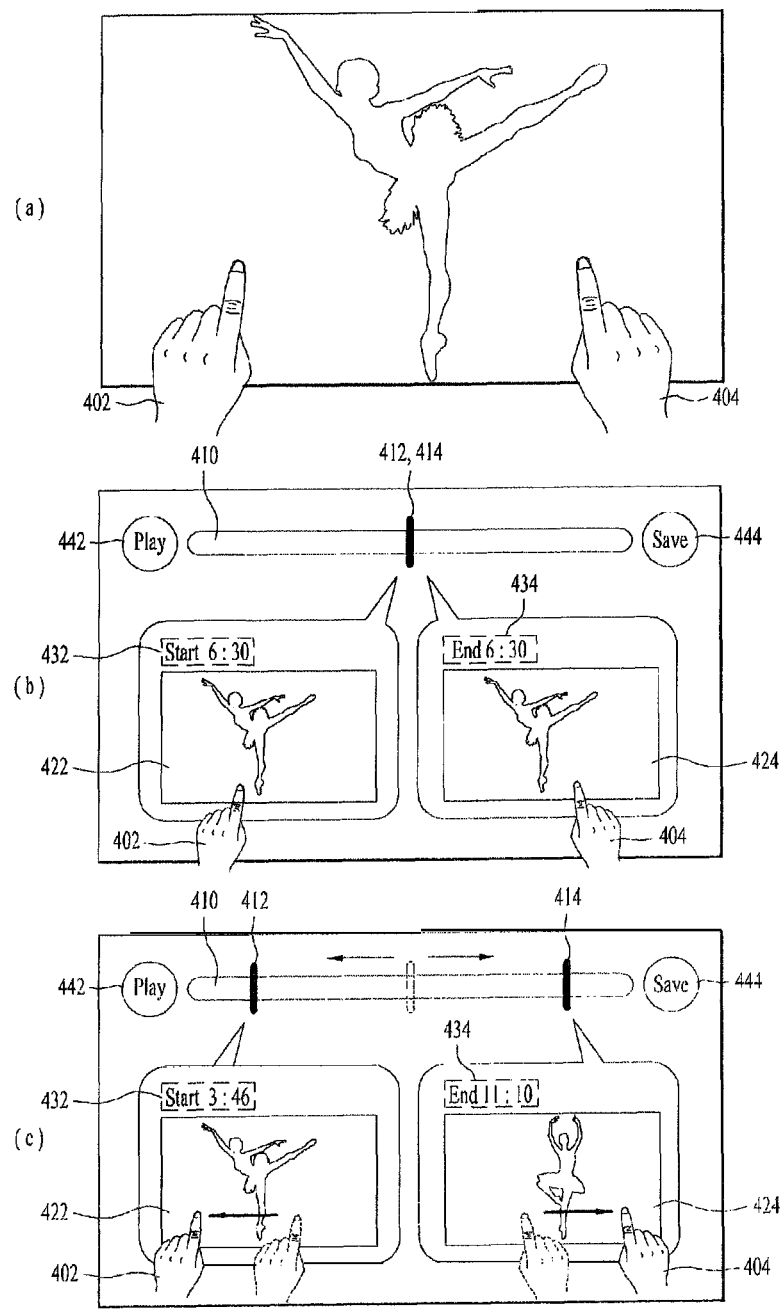
FIG. 4 is a diagram for screen configurations of switching to a video editing mode in the course of playing a video content.

FIG. 4 is a diagram for screen configurations of switching to a video editing mode in the course of playing a video content.

Referring to FIG. 4, while a video content played screen is displayed, if a $1^{st}$ pointer 402 and a $2^{nd}$ pointer 404 are simultaneously detected from the touchscreen [FIG. 4 (a)], the controller 180 stops playing a video content and then controls a video editing mode to be entered [FIG. 4 (b)]. Once the video editing mode is entered, the controller 180 controls a progress bar 410 to be displayed on the touchscreen and controls a $1^{st}$ time indicator 412 and a $2^{nd}$ time indicator 414 to be displayed on the progress bar 410. In doing so, in an initial scene of video editing mode, the $1^{st}$ and $2^{nd}$ time indicators 412 and 414 may be displayed at the same position on the progress bar 410 in a manner of being superposed on each other. In case that the $1^{st}$ and $2^{nd}$ time indicators 412 and 414 are displayed at the same position on the progress bar 410 in a manner of being superposed on each other, one of the $1^{st}$ and $2^{nd}$ time indicators 412 and 414 may not be displayed on the touchscreen in a manner of being blocked by the other. While the $1^{st}$ and $2^{nd}$ time indicators 412 and 414 are displayed in a manner of being superposed on each other, if both of the $1^{st}$ and $2^{nd}$ pointers 402 and 404 are simultaneously released from the touchscreen, the controller 180 ends the editing mode and controls a current screen to return to the video play screen shown in FIG. 4A. Referring to FIG. 4 (c), after the $1^{st}$ pointer 402 and the $2^{nd}$ pointer 404 have been spaced apart from each other, even if both of the $1^{st}$ and $2^{nd}$ pointers 402 and 404 are simultaneously released from the touchscreen, the editing mode may continue.

Moreover, in the editing mode [cf. FIG. 4 (b) and FIG. 4 (c)], the controller 180 may control a $1^{st}$ scene 422 at a $1^{st}$ time corresponding to the $1^{st}$ time indicator 412 and a $2^{nd}$ scene 424 at a $2^{nd}$ time corresponding to the $2^{nd}$ time indicator 414 to be displayed on the touchscreen as well. Moreover, the controller 180 may control a numerical value 432 of the $1^{st}$ time and a numerical value 434 of the $2^{nd}$ time to be further displayed on the touchscreen. If a play button 442 is selected, the controller 180 may be able to play a video between the $1^{st}$ time of the $1^{st}$ time indicator and the $2^{nd}$ time of the $2^{nd}$ time indicator. If a save button 444 is selected, the controller 180 may control a video between the $1^{st}$ time of the $1^{st}$ time indicator and the $2^{nd}$ time of the $2^{nd}$ time indicator to be saved in the memory 160.

FIG. 4a shows that the video editing mode can be entered by touching the $1^{st}$ pointer 402 and the $2^{nd}$ pointer 404 at random points on the touchscreen, while a video content plays via touchscreen. According to another embodiment of the present invention, if a $1^{st}$ pointer and a $2^{nd}$ pointer touch a preset $1^{st}$ region and a preset $2^{nd}$ region, respectively, the controller 180 may set an editing mode to be entered.

The $1^{st}$ time indicator and the $2^{nd}$ time indicator may be able to move on the progress bar. If the $1^{st}$ time indicator and the $2^{nd}$ time indicator move, the controller 180 may control the $1^{st}$ scene and the $2^{nd}$ scene to be changed to correspond to the moving $1^{st}$ and $2^{nd}$ time indicators, respectively.

In particular, if the $1^{st}$ or 2nd pointer is touched & dragged in at least one of $1^{st}$ to $3^{rd}$ regions [S304], the controller 180 may control at least one of the $1^{st}$ time indicator and the $2^{nd}$ time indicator to move [S305 to S307].

First of all, if the $1^{st}$ pointer and/or the $2^{nd}$ pointer is touched and/or dragged on the $1^{st}$ region and/or the $2^{nd}$ region, the controller 180 may control the $1^{st}$ time indicator and/or the $2^{nd}$ time indicator to move [S305, S306].

Figure 5:
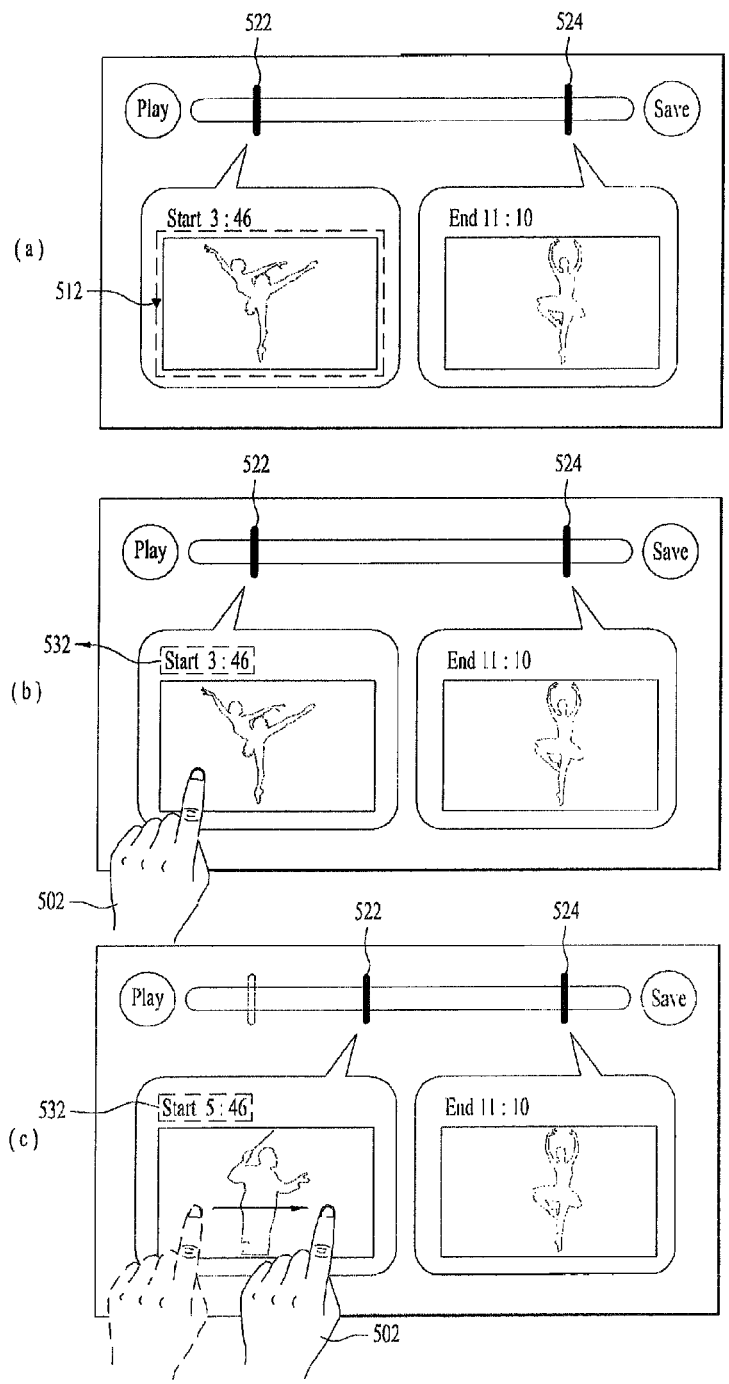
FIG. 5 is a diagram for screen configurations to describe the progress of a $1^{st}$ time indicator.

FIG. 5 is a diagram for screen configurations to describe the progress of a $1^{st}$ time indicator.

Referring to FIG. 5, assume that a part of the touchscreen, on which a $1^{st}$ scene is displayed, is set to a $1^{st}$ region 512 [FIG. 5A]. In doing so, referring to FIG. 5 (b) and FIG. 5 (c), if a $1^{st}$ pointer 502 is touched & dragged on the $1^{st}$ region 512 in left-to-right direction, the controller 180 may control a $1^{st}$ time indicator 522 to move in left-to-right direction. To correspond to the progress of the $1^{st}$ time indicator 522, the controller 180 may be able to control a $1^{st}$ time 532 and a $1^{st}$ scene to be updated.

On the contrary, if the 1$^{st}$ pointer 502 is touched & dragged on the 1$^{st}$ region 512 in right-to-left direction in order of FIG. 5 (c) and FIG. 5 (b), The controller 180 may control the 1$^{st}$ time indicator 522 to move in right-to-left direction.

Figure 6:
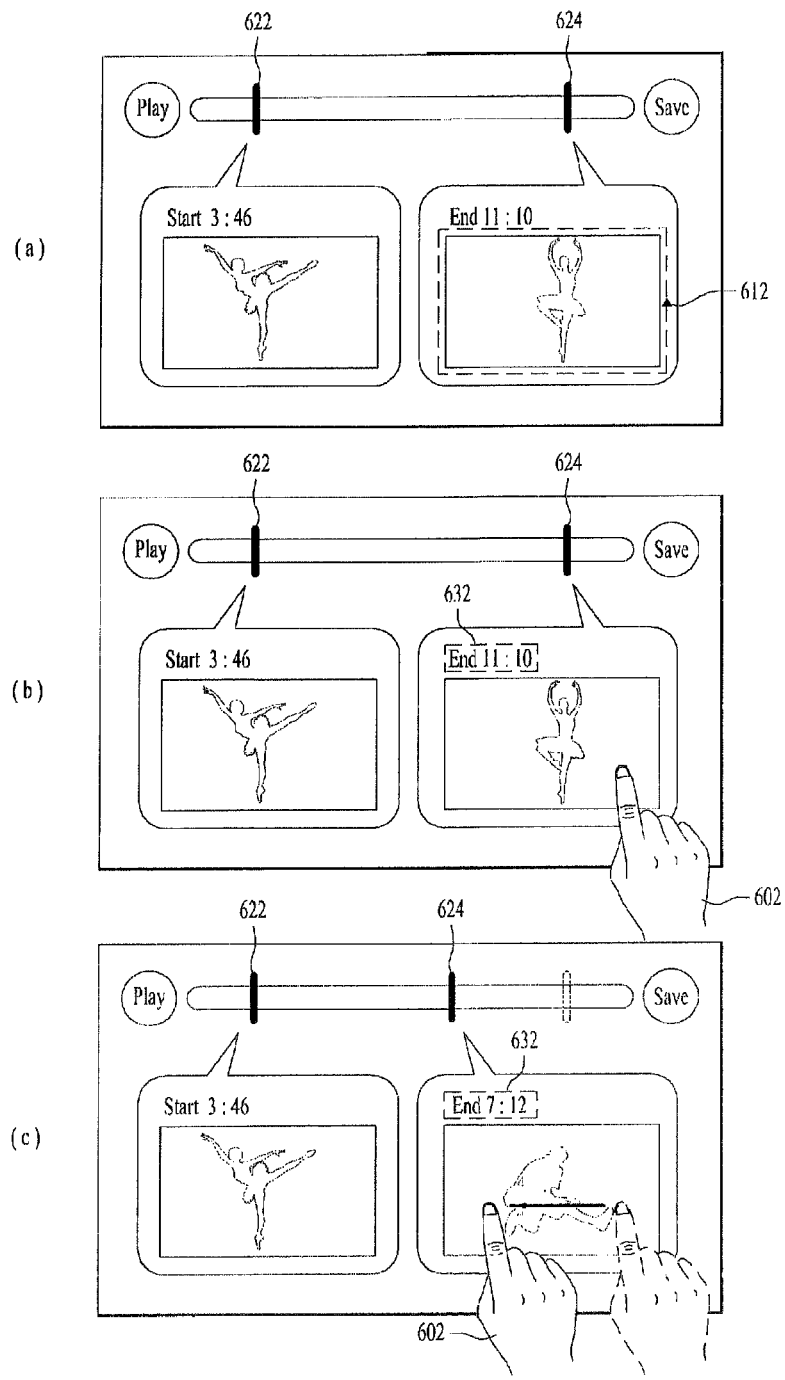
FIG. 6 is a diagram for screen configurations to describe the progress of a $2^{nd}$ time indicator.

FIG. 6 is a diagram for screen configurations to describe the progress of a 2$^{nd}$ time indicator.

Referring to FIG. 6, assume that a part of the touchscreen, on which a 2$^{nd}$ scene is displayed, is set to a 2$^{nd}$ region 612 [FIG. 6A]. As mentioned in the foregoing description with reference to FIG. 5, if a 1$^{st}$ pointer 602 (or a 2$^{nd}$ pointer) is touched & dragged on the 2$^{nd}$ region 612, the controller 180 may control a 2$^{nd}$ time indicator 624 to move and may be able to control a 2$^{nd}$ view 632 and a 2$^{nd}$ scene to be updated as well.

Although FIG. 5 or FIG. 6 shows that the 1$^{st}$ or 2$^{nd}$ pointer is touched & dragged on one of the 1$^{st}$ region and the 2$^{nd}$ region for example, the 1$^{st}$ pointer and the 2$^{nd}$ pointer may be touched & dragged on the 1$^{st}$ region and the 2$^{nd}$ region, respectively. In doing so, if the 1$^{st}$ pointer and the 2$^{nd}$ pointer are simultaneously touched & dragged on the 1$^{st}$ region and the 2$^{nd}$ region, respectively, the controller 180 may control both of the 1$^{st}$ time indicator and the 2$^{nd}$ time indicator to move. In particular, the controller 180 controls the 1$^{st}$ time indicator to move on the basis of a touch & drag input of the 1$^{st}$ pointer and also controls the 2$^{nd}$ time indicator to move on the basis of a touch & drag input of the 2$^{nd}$ pointer.

In doing so, although the 1$^{st}$ pointer or the 2$^{nd}$ pointer is touched & dragged on the 1$^{st}$ region or the 2$^{nd}$ region in the same distance, the controller 180 may control a traveling distance of the 1$^{st}$ time indicator or the 2$^{nd}$ time indicator to vary in accordance with a touch & drag position or a touch & drag trajectory of the pointers.

Figure 7:
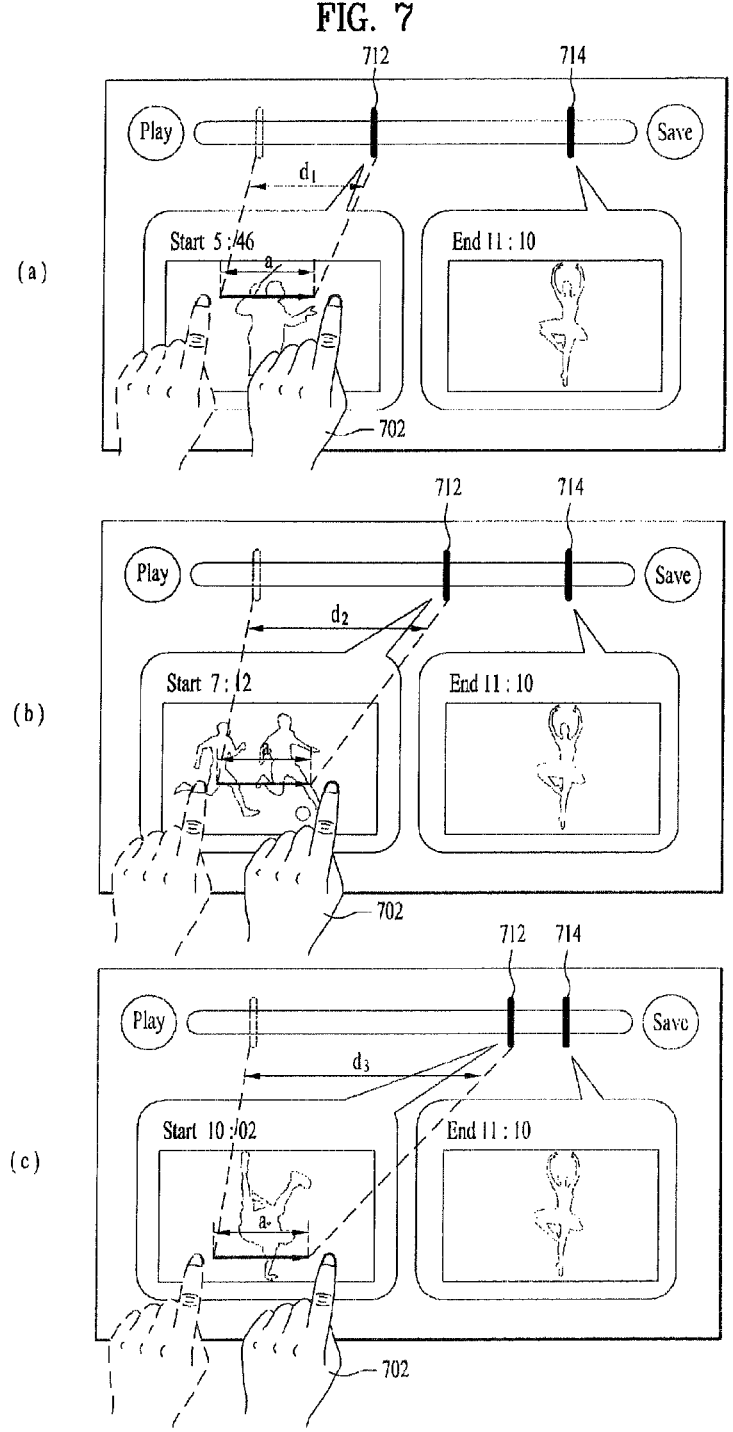
FIG. 7 is a diagram for screen configurations to describe that a traveling distance of a $1^{st}$ time indicator is differently applied in accordance with a touch & drag position of a $1^{st}$ pointer.

FIG. 7 is a diagram for screen configurations to describe that a traveling distance of a 1$^{st}$ time indicator is differently applied in accordance with a touch & drag position of a 1$^{st}$ pointer.

Referring to FIG. 7, if a 1$^{st}$ pointer 702 is touched & dragged on a top portion of a 1$^{st}$ region in left-to-right direction by 'a', the controller 180 may control a 1$^{st}$ time indicator 712 to move in left-to-right direction by 'd1' [FIG. 7 (a)]. If a 1$^{st}$ pointer 702 is touched & dragged on a middle portion of a 1$^{st}$ region by 'a', the controller 180 may control a 1$^{st}$ time indicator 712 to move in left-to-right direction by 'd2' [FIG. 7 (b)]. If a 1$^{st}$ pointer 702 is touched & dragged on a bottom portion of a 1$^{st}$ region by 'a', the controller 180 may control a 1$^{st}$ time indicator 712 to move in left-to-right direction by 'd3' [FIG. 7 (c)].

Figure 8:
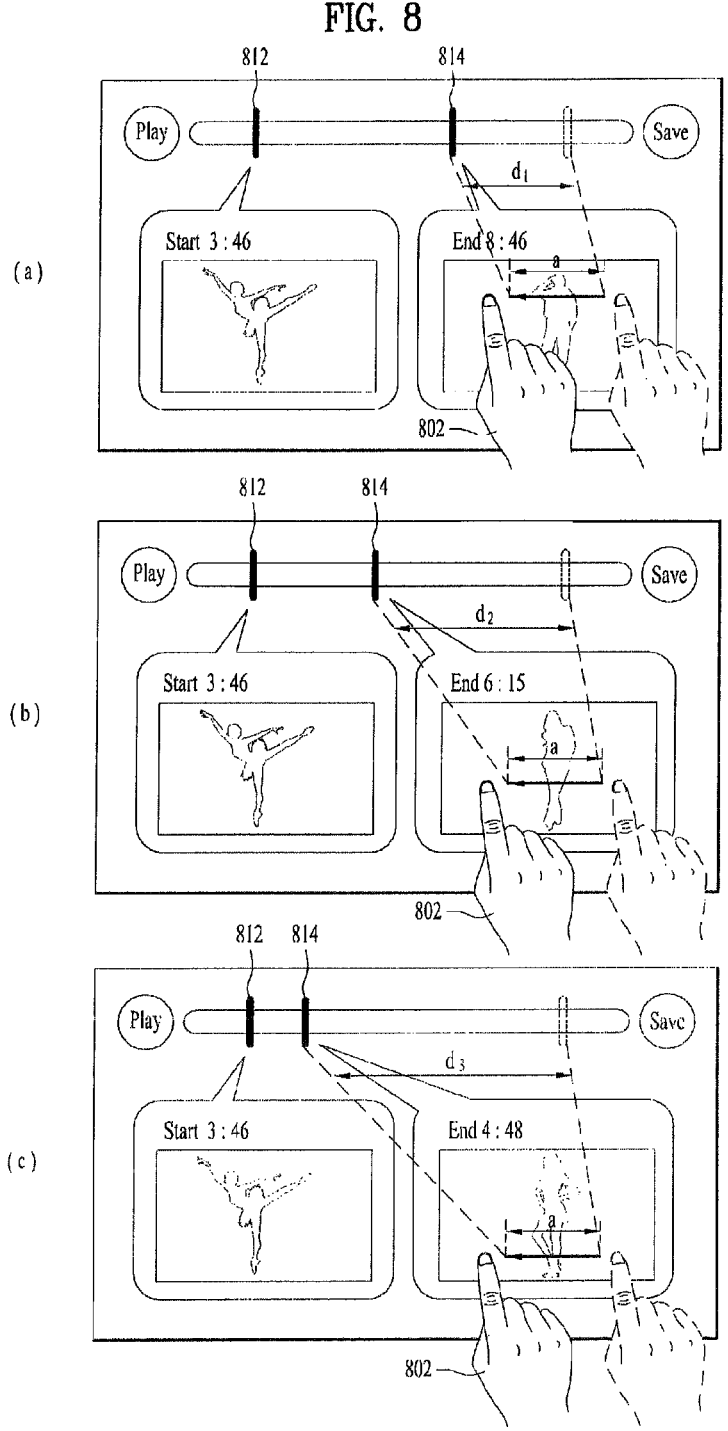
FIG. 8 is a diagram for screen configurations to describe that a traveling distance of a $2^{nd}$ time indicator is differently applied in accordance with a touch & drag position of a $1^{st}$ pointer.

FIG. 8 is a diagram for screen configurations to describe that a traveling distance of a 2$^{nd}$ time indicator is differently applied in accordance with a touch & drag position of a 1$^{st}$ pointer. Like FIG. 7, even if a 1$^{st}$ pointer 802 is touched & dragged by a same distance 'a', the controller 180 may control a traveling distance of a 2$^{nd}$ time indicator 814 to vary in accordance with a touch & drag position.

In particular, referring to FIG. 7 and FIG. 8, the controller 180 may control the traveling distances of the 1$^{st}$ and 2$^{nd}$ time indicators to vary by depending on a prescribed position of the 1$^{st}$ region at which the 1$^{st}$ pointer has moved.

Moreover, the controller 180 may control a traveling distance of the 1$^{st}$ time indicator to apply differently in accordance with a touch & drag trajectory of the 1$^{st}$ pointer (or the 2$^{nd}$ pointer).

Figure 9:
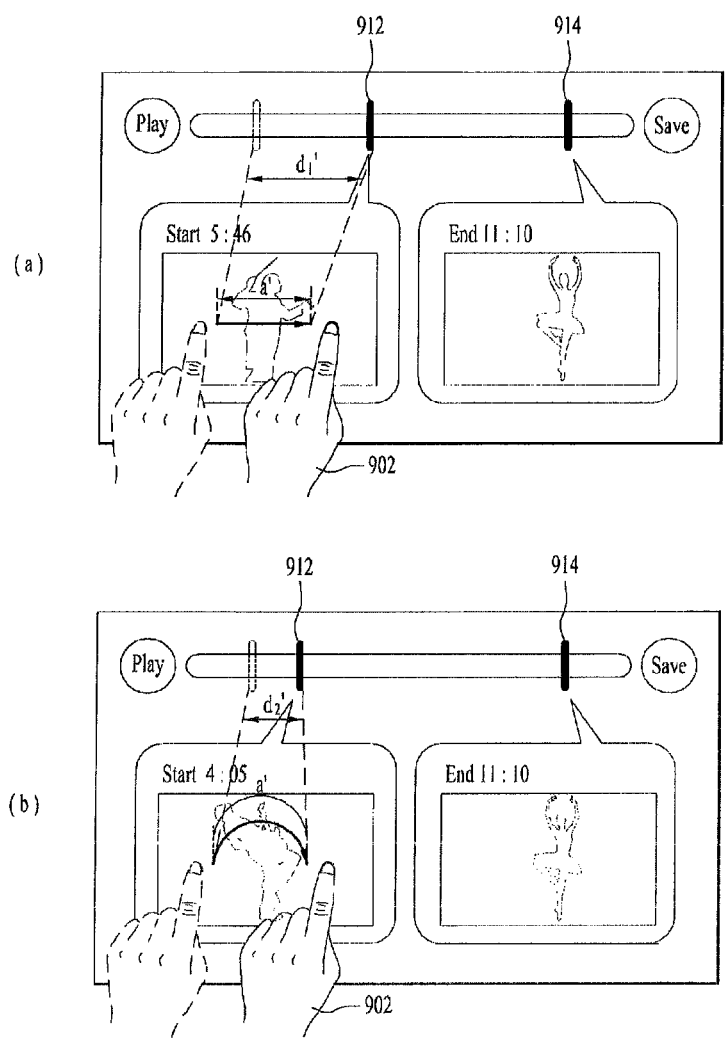
FIG. 9 is a diagram for screen configurations to describe that a traveling distance of a $1^{st}$ time indicator is differently applied in accordance with a touch & drag trajectory.

FIG. 9 is a diagram for screen configurations to describe that a traveling distance of a 1$^{st}$ time indicator is differently applied in accordance with a touch & drag trajectory.

Referring to FIG. 9, if a 1$^{st}$ pointer 902 is touched & dragged along a straight path amounting to a length a', the controller 180 may control a 1$^{st}$ time indicator 912 to move in left-to-right direction by d1' [FIG. 9 (a)]. After the 1$^{st}$ pointer 902 has been touched & dragged clockwise along a curved path amounting to a length a', the controller 180 may control a 1$^{st}$ time indicator 912 to move in left-to-right direction by d2' [FIG. 9 (b)].

Figure 10:
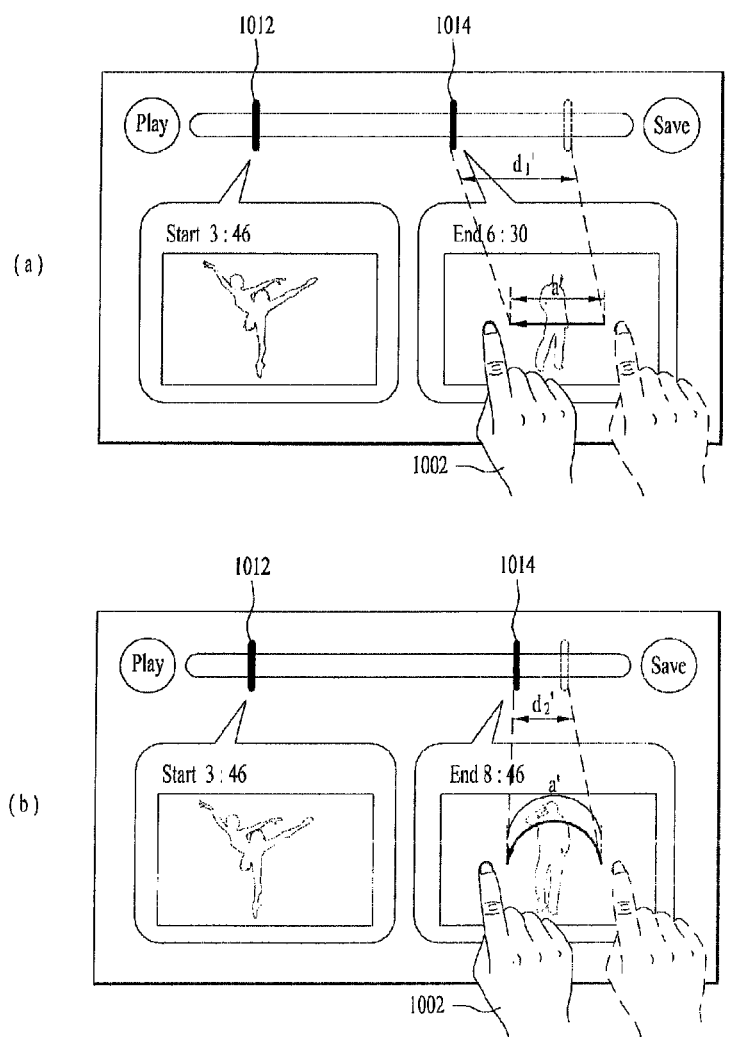
FIG. 10 is a diagram for screen configurations to describe that a traveling distance of a $2^{nd}$ time indicator is differently applied in accordance with a touch & drag trajectory.

FIG. 10 is a diagram for screen configurations to describe that a traveling distance of a 2$^{nd}$ time indicator is differently applied in accordance with a touch & drag trajectory. As mentioned in the foregoing description with reference to FIG. 9, even if a 1$^{st}$ pointer 1002 (or a 2$^{nd}$ pointer) is touched & dragged by the same distance a', the controller 180 may control a traveling distance of a 2$^{nd}$ time indicator 1014 to apply differently in accordance with a traveling trajectory of the 1$^{st}$ pointer 1002.

Referring to FIG. 9 and FIG. 10, even if the 1$^{st}$ pointer (or the 2$^{nd}$ pointer) is touched & dragged on the 1$^{st}$ region or the 2$^{nd}$ region by the same distance, the controller 180 may control a traveling distance of the 1$^{st}$ or 2$^{nd}$ time indicator to apply differently in accordance with a touch & drag trajectory.

As mentioned in the foregoing descriptions with reference to FIGS. 7 to 10, by controlling a traveling distance of a 1$^{st}$ or 2$^{nd}$ time indicator to vary in accordance with a touch & drag position or trajectory of a 1$^{st}$ or 2$^{nd}$ pointer, a user may be able to adjust positions of the 1$^{st}$ and 2$^{nd}$ time indicators more precisely.

Subsequently, if the 1$^{st}$ or 2$^{nd}$ pointer is touched & dragged on a 3$^{rd}$ region different from each of the 1$^{st}$ region and the 2$^{nd}$ region, the controller 180 may control both of the 1$^{st}$ time indicator and the 2$^{nd}$ time indicator to move simultaneously [S307].

Figure 11:
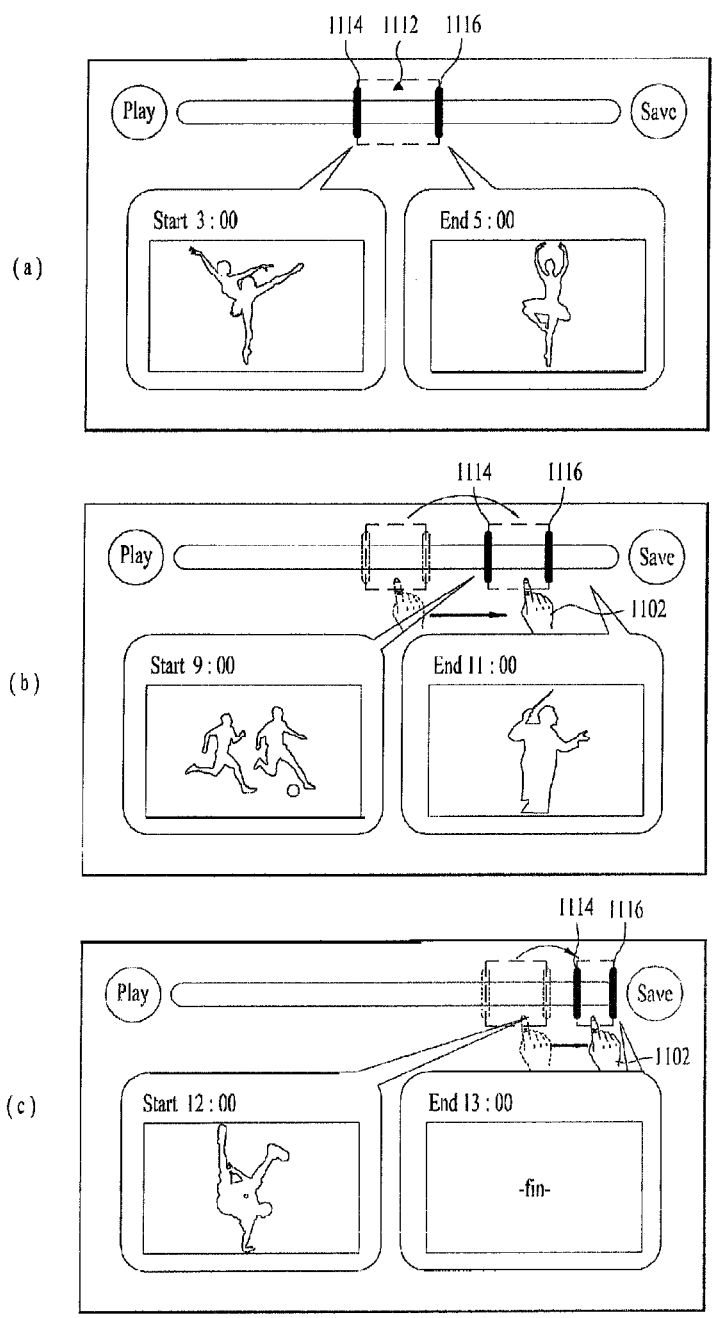
FIG. 11 is a diagram for screen configurations to show that both a $1^{st}$ time indicator and a $2^{nd}$ time indicator move simultaneously if a $1^{st}$ pointer is touched & dragged in a $3^{rd}$ region.

FIG. 11 is a diagram for screen configurations to show that both a 1$^{st}$ time indicator and a 2$^{nd}$ time indicator move simultaneously if a 1$^{st}$ pointer is touched & dragged in a 3$^{rd}$ region.

Referring to FIG. 11, assume that a space between a 1$^{st}$ time indicator 1114 and a 2$^{nd}$ time indicator 1116 is a 3$^{rd}$ region 1112 [FIG. 11 (a)]. While the 3$^{rd}$ region 1112 is touched, if a 1$^{st}$ pointer 1102 is dragged in left-to-right direction, the controller 180 may be able to control both of the 1$^{st}$ and 2$^{nd}$ time indicators 1114 and 1116 to move simultaneously in the dragged direction of the 1$^{st}$ pointer 1102 [FIG. 11 (b)]. In particular, the controller 180 may control the 1$^{st}$ and 2$^{nd}$ time indicators 1114 and 1116 to move on a progress bar by maintaining an equal space in-between.

After the 2$^{nd}$ time indicator 1116 has arrived at an end point of the progress bar, if the 1$^{st}$ pointer 1102 keeps moving in left-to-right direction, the controller 180 may control the 1$^{st}$ time indicator 1114 to move in left-to-right direction only while the 2$^{nd}$ time indicator 1116 is fixed to the end point of the progress bar [FIG. 11 (c)]. In doing so, the space between the 1$^{st}$ time indicator 1114 and the 2$^{nd}$ time indicator 1116 becomes narrower.

On the contrary, if the 1$^{st}$ pointer 1102 is dragged in right-to-left direction, the controller 180 may be able to control both of the 1$^{st}$ and 2$^{nd}$ time indicators 1114 and 1116 to move in the right-to-left direction [FIG. 11 (b)]. After the 1$^{st}$ time indicator 1114 has arrived at a start point of the progress bar, if the 1$^{st}$ pointer 1102 keeps moving in right-to-left direction, the controller 180 may control the 2$^{nd}$ time indicator 1116 to move in right-to-left direction only while the 1$^{st}$ time indicator 1114 is fixed to the start point of the progress bar.

As mentioned in the foregoing descriptions with reference to FIGS. 5 to 11 so far, if a $1^{st}$ pointer is touched & dragged on a specific region (e.g., at least one of $1^{st}$ to $3^{rd}$ regions) of a touchscreen, a $1^{st}$ time indicator and a $2^{nd}$ time indicator may move, by which the present invention may be non-limited.

According to another embodiment of the present invention, the controller 180 may control a $1^{st}$ time indicator or a $2^{nd}$ time indicator to move to a different position by adjusting a numerical value of a $1^{st}$ or $2^{nd}$ view.

Figure 12:
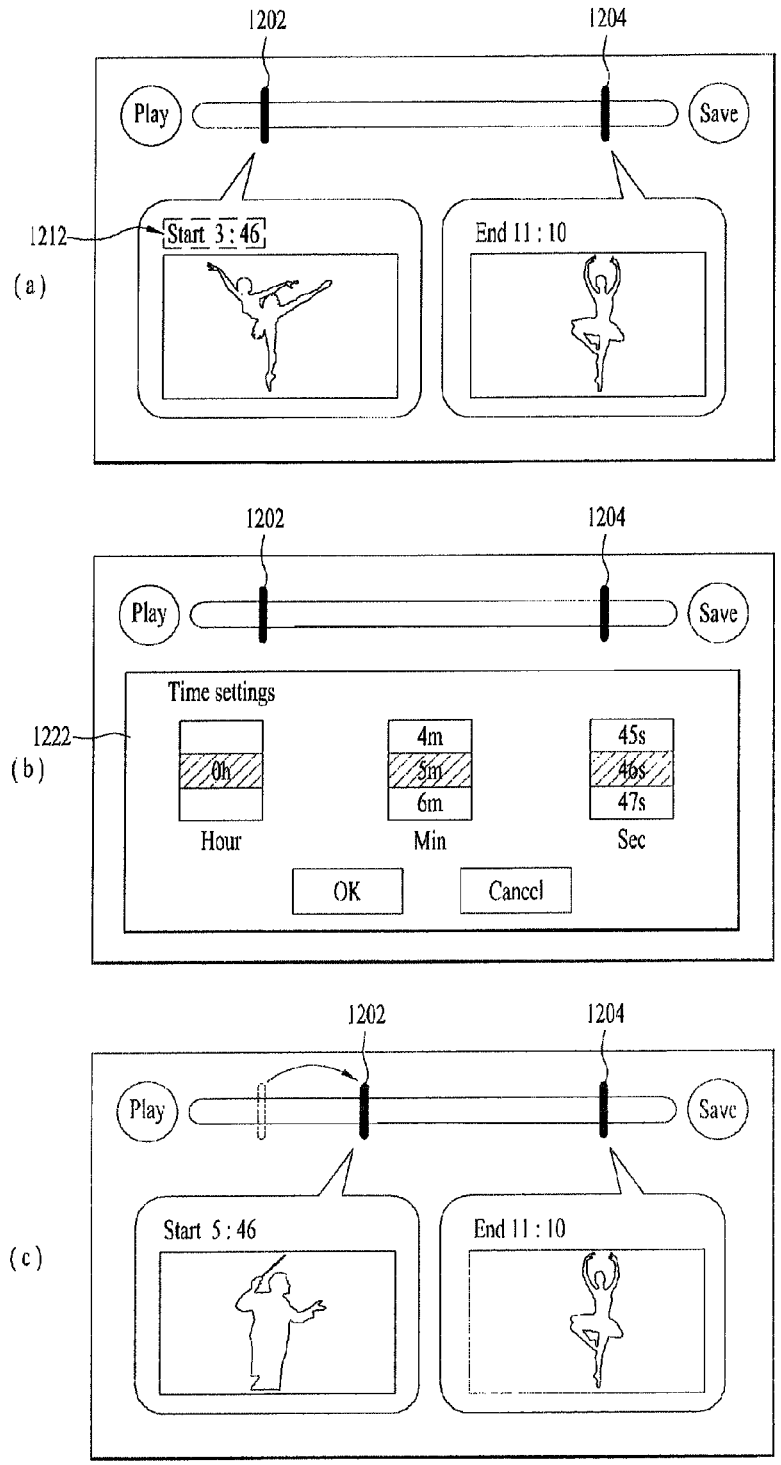
FIG. 12 is a diagram for screen configurations of adjusting a position of a $1^{st}$ time indicator by adjusting a numerical value of a $1^{st}$ time.

FIG. 12 is a diagram for screen configurations of adjusting a position of a $1^{st}$ time indicator by adjusting a numerical value of a $1^{st}$ time.

Referring to FIG. 12, if a region 1212, on which a numerical value of a $1^{st}$ time is displayed, is touched with a $1^{st}$ pointer [FIG. 12 (a)], the controller 180 may be able to provide a popup window 1222 for adjusting the numerical value of the $1^{st}$ time [FIG. 12 (b)]. If the numerical value of the $1^{st}$ time is modified, the controller 180 may control a $1^{st}$ time indicator 1202 to move to a $1^{st}$ time of the modified numerical value [FIG. 12 (c)].

Figure 13:
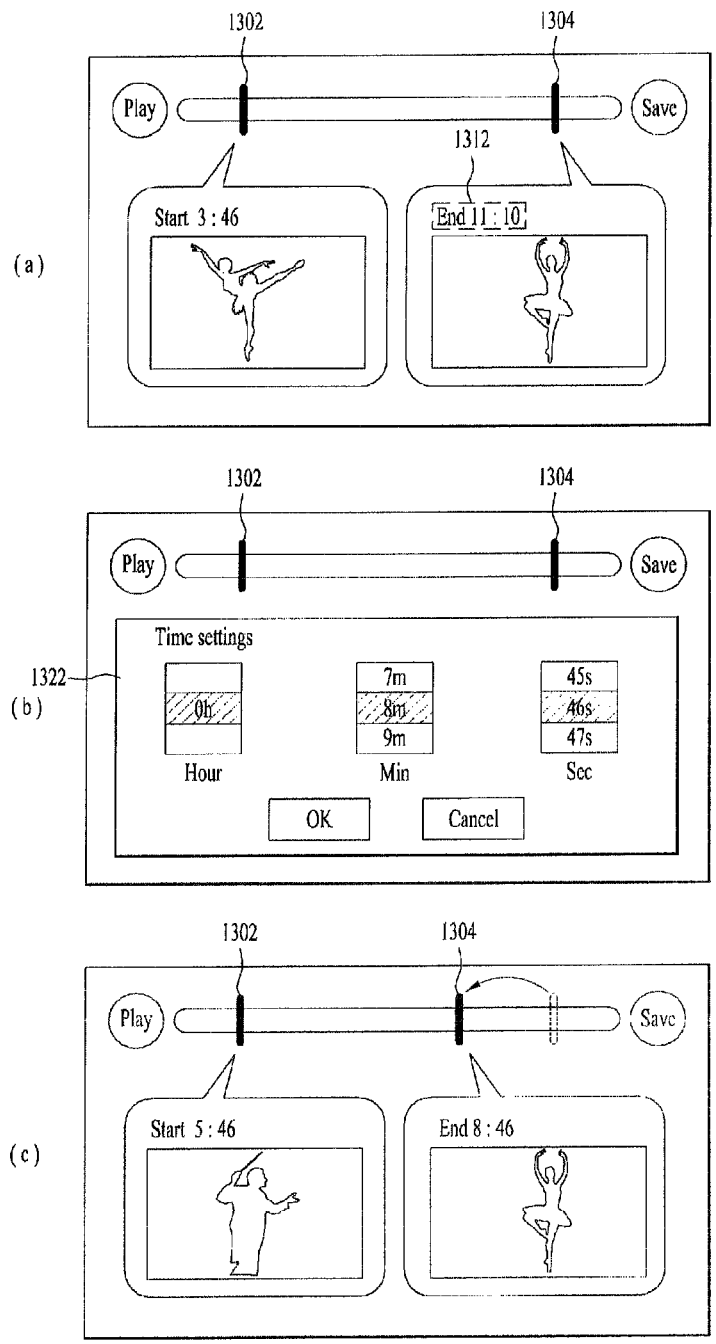
FIG. 13 is a diagram for screen configurations of adjusting a position of a $2^{nd}$ time indicator by adjusting a numerical value of a $2^{nd}$ time.

FIG. 13 is a diagram for screen configurations of adjusting a position of a $2^{nd}$ time indicator by adjusting a numerical value of a $2^{nd}$ time.

Referring to FIG. 13, as mentioned in the foregoing description with reference to FIG. 12, if a region 1312, on which a numerical value of a $2^{nd}$ time is displayed, is touched with a $1^{st}$ pointer (or a $2^{nd}$ pointer), the numerical value of the $2^{nd}$ time can be modified via a provided popup window 1322. Thereafter, the controller 180 may control a $2^{nd}$ time indicator 1304 to move to a $2^{nd}$ time of the modified numerical value.

In doing so, the controller 180 may control the numerical value of the $1^{st}$ time not to be adjustable into a value after the $2^{nd}$ time and control the numerical value of the $2^{nd}$ time not to be adjustable into a value before the $1^{st}$ time. For instance, if a value after the $2^{nd}$ time is inputted to the screen for adjusting the numerical value of the $1^{st}$ time, the controller 180 may control the inputted value to be automatically adjusted into a numerical value of the $2^{nd}$ time or a numerical value before the $2^{nd}$ time or control a warning message to be displayed on the touchscreen to indicate that a wrong numerical value of the $1^{st}$ time has been inputted.

According to the foregoing descriptions with reference to FIGS. 5 to 13, a progressing bar, a $1^{st}$ time indicator and a $2^{nd}$ time indicator are arranged on a top portion of a screen and a $1^{st}$ scene and a $2^{nd}$ scene are displayed below them, by which the present invention may be non-limited. Alternatively, a progressing bar, a $1^{st}$ time indicator and a $2^{nd}$ time indicator may be displayed in a manner of not being fixed to initially displayed positions but changing their positions in various ways to correspond to a situation.

Figure 14:
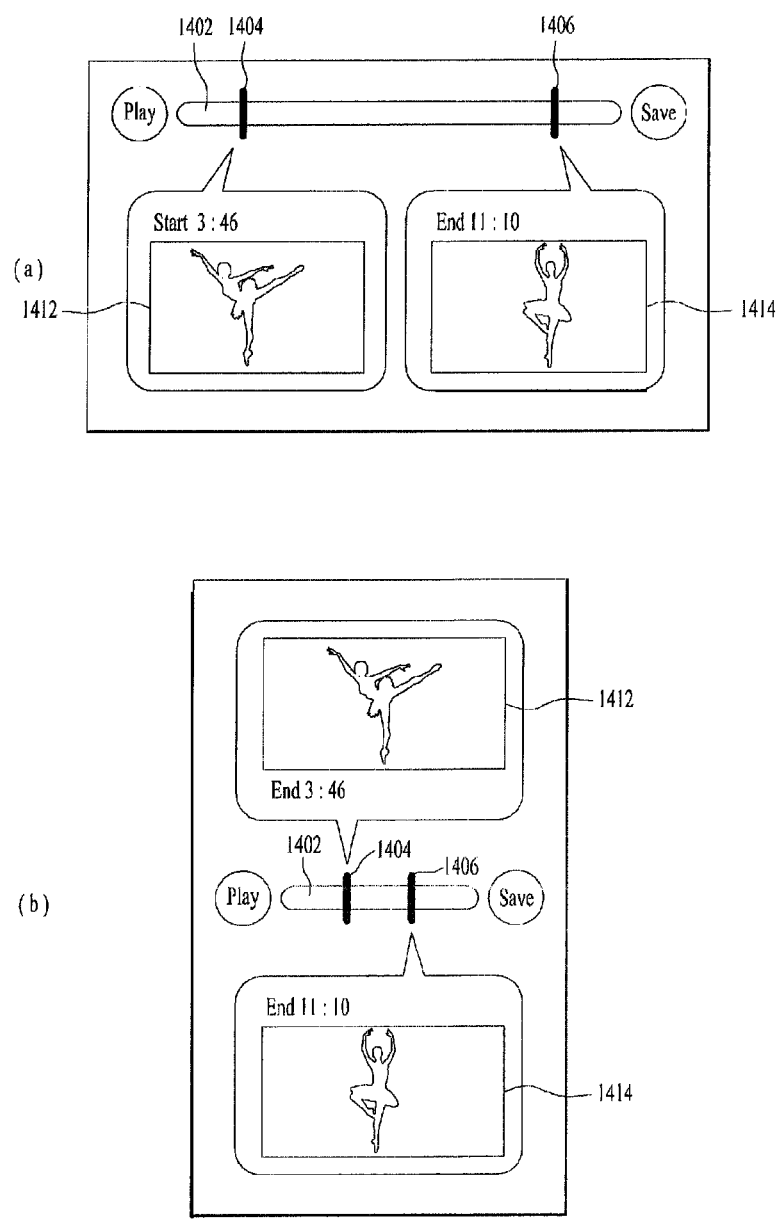
FIG. 14 is a diagram of screen configurations to show that display positions of a progress bar, a $1^{st}$ time indicator and a $2^{nd}$ time indicator are changed in accordance with an operating mode of a touchscreen.

FIG. 14 is a diagram of screen configurations to show that display positions of a progress bar, a $1^{st}$ time indicator and a $2^{nd}$ time indicator are changed in accordance with an operating mode of a touchscreen.

FIG. 14 (a) is a diagram of screen configuration when a touchscreen operates in landscape mode. Referring to FIG. 14 (a), when a touchscreen operates in landscape mode, the controller 180 may control a progress bar 1402, a $1^{st}$ time indicator 1404 and a $2^{nd}$ time indicator 1406 to be displayed on a top portion (or a bottom portion) of a screen. And, the controller 180 may control a $1^{st}$ scene 1412 and a $2^{nd}$ scene 1414 to be arranged below the progress bar in a manner of being symmetric to each other with reference to a vertical axis.

FIG. 14 (b) is a diagram of screen configuration when a touchscreen operates in portrait mode. Referring to FIG. 14 (b), when a touchscreen operates in portrait mode, the controller 180 may control a progress bar 1402, a $1^{st}$ time indicator 1404 and a $2^{nd}$ time indicator 1406 to be displayed on a middle portion of a screen. And, the controller 180 may control a $1^{st}$ scene 1412 and a $2^{nd}$ scene 1414 to be arranged in a manner of being symmetric to each other with reference to the progress bar 1402.

Subsequently, the controller 180 may control a video between the $1^{st}$ time of the $1^{st}$ time indicator and the $2^{nd}$ time of the $2^{nd}$ time indicator to be saved in the memory 160 [S308]. In particular, the controller 180 may substitute the original video content with the video between the $1^{st}$ time and the $2^{nd}$ time. And, the controller 180 creates a new content different from the original video content and then controls the created new content to be saved as the video between the $1^{st}$ time and the $2^{nd}$ time.

In this case, a file format of the new content may be at least one of a video file format, a moving graphic image file format (.gif), a vector graphic image file format (.swf) and the like.

Figure 15:
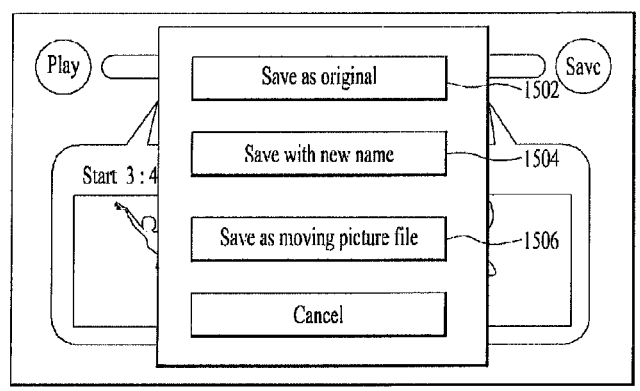
FIG. 15 is a diagram for screen configuration provided to a user to save a video between a $1^{st}$ time and a $2^{nd}$ time.

FIG. 15 is a diagram for screen configuration provided to a user to save a video between a $1^{st}$ time and a $2^{nd}$ time.

Referring to FIG. 15, if a save button 444 shown in FIG. 4 is selected via a $1^{st}$ pointer, the controller 180 may control a menu screen shown in FIG. 15 to be displayed. If a user selects a button 'save as original' 1502, the controller 180 may control a video between a $1^{st}$ view and a $2^{nd}$ view to be saved by replacing an original content. If a user selects a button 'save with new name' 1504, the controller 180 may control a video between a $1^{st}$ view and a $2^{nd}$ view to be saved as a new video content separately from an original content.

If a user selects a button 'save as moving picture file' 1506, the controller 180 may control a video between a $1^{st}$ time and a $2^{nd}$ time to be saved in the memory 160 by being converted to a moving graphic image (.gif) or a vector graphic image (.swf).

Moreover, if a position of a $1^{st}$ time indicator and a position of a $2^{nd}$ time indicator are equal to each other on a progress bar (i.e., if a $1^{st}$ time is equal to a $2^{nd}$ time), the controller 180 may control a stillcut of the corresponding time to be saved in the memory 160.

According to another embodiment of the present invention, the controller 180 may substitute an original video content with a video of a remaining part except a video between a $1^{st}$ time and a $2^{nd}$ time. And, the controller 180 may create a new video content different from an original video content and save the new video content as a video of a remaining part except a video between a $1^{st}$ time and a $2^{nd}$ time.

If a video between a $1^{st}$ time and a $2^{nd}$ time is saved, the controller 180 ends the editing mode and may control an output of the touchscreen to return to the video play screen.

According to the embodiment mentioned in the foregoing description, a $1^{st}$ region is defined above a $1^{st}$ scene, a $2^{nd}$ region is defined above a $2^{nd}$ scene, and a $3^{rd}$ region is defined between a $1^{st}$ time indicator and a $2^{nd}$ indicator. This description is just provided to facilitate the description of the present invention but does not intend to put limitation on the present invention. Alternatively, the $1^{st}$ to $3^{rd}$ regions may be designated in various ways in addition to the aforementioned positions.

For instance, a $1^{st}$ time indicator displayed position and a $2^{nd}$ time indicator displayed position may be set to match a $1^{st}$ region and a $2^{nd}$ region, respectively. In this case, a user may be able to move a $1^{st}$ time indicator and/or a $2^{nd}$ time indicator in a manner of touching & dragging the 1$^{st}$ time indicator or the 2$^{nd}$ time indicator directly.

It is not mandatory for the 3$^{rd}$ region to be implemented on the touchscreen. Instead, the step S307 is omitted and positions of the 1$^{st}$ and 2$^{nd}$ time indicators may be controlled to be adjusted via the 1$^{st}$ and 2$^{nd}$ regions only.

According to another embodiment of the present invention, the controller 180 controls a video between a 1$^{st}$ time and a 2$^{nd}$ time to be temporarily saved and may then control the video between the 1$^{st}$ time and the 2$^{nd}$ time to be inserted into a desired position.

FIG. 16 is a diagram for screen configurations to show that a video between a 1$^{st}$ time and a 2$^{nd}$ time is inserted in a desired position.

Referring to FIG. 16, if a space 1602 between a is time indicator 1604 and a 2$^{nd}$ time indicator 1606 is touched with a 1$^{st}$ pointer for prescribed duration, the controller 180 may control a pop window 1612 to be displayed [FIG. 16 (a)]. The controller 180 may crop or copy a video between a 1$^{st}$ time and a 2$^{nd}$ time, and save the corresponding video in the memory 160 temporarily, through a user input using the popup window. Thereafter, if a desired position 1610 on a progress bar is pressed with the 1$^{st}$ pointer for prescribed duration, the controller 180 may control a popup window 1614 to be displayed [FIG. 16 (b)]. Through a user input using the popup window 1614, the controller 180 may control the video between the 1$^{st}$ time and the 2$^{nd}$ time, which is saved in the memory 160 temporarily, to be inserted into a 3$^{rd}$ time corresponding to the desired position 1610.

According to another embodiment of the present invention, the above-mentioned editing mode may be set to be ended if one of a 1$^{st}$ pointer and a 2$^{nd}$ pointer is released from the touchscreen. If one of the 1$^{st}$ and 2$^{nd}$ pointers is released, the controller 180 ends a video editing mode and controls an output of the touchscreen to return to the video play screen. Alternatively, if one of the 1$^{st}$ and 2$^{nd}$ pointers is released, the controller 180 may control the menu screen shown in FIG. 15 to be outputted.

Figure 17:
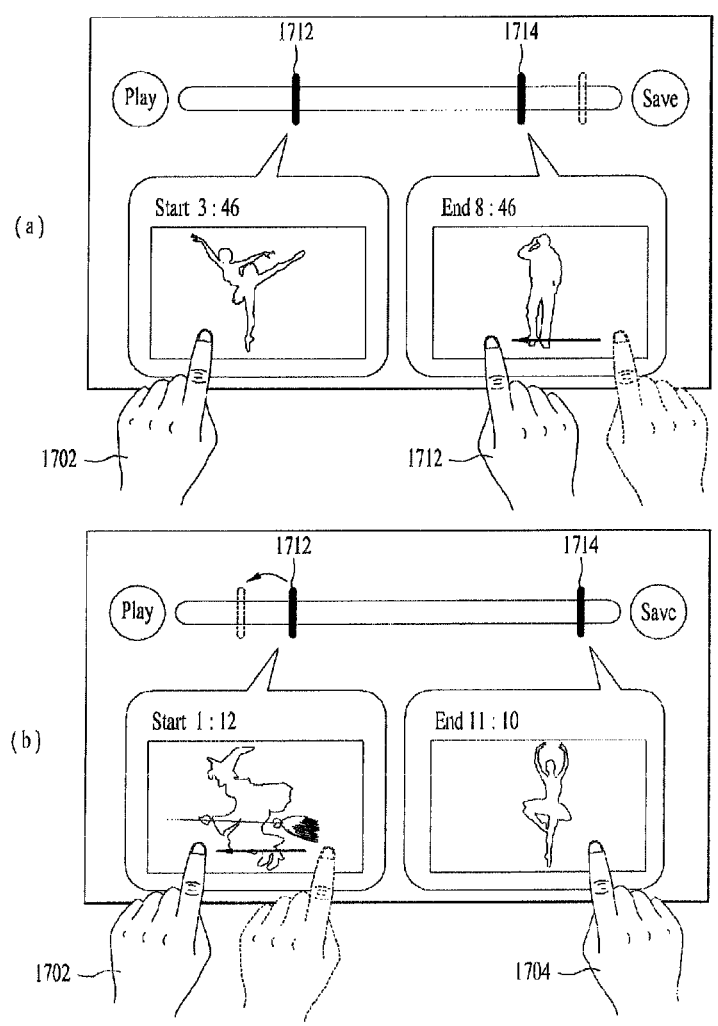
FIG. 17 is a diagram for screen configurations to adjust positions of $1^{st}$ and $2^{nd}$ time indicators if a video editing mode is set to end on releasing either a $1^{st}$ pointer or a $2^{nd}$ pointer from the screen.

FIG. 17 is a diagram for screen configurations to adjust positions of 1$^{st}$ and 2$^{nd}$ time indicators if a video editing mode is set to end on releasing either a 1$^{st}$ pointer or a 2$^{nd}$ pointer from the screen.

Referring to FIG. 17, while a 1$^{st}$ pointer 1702 is fixed to a 1$^{st}$ region, if a 2$^{nd}$ pointer 1704 is touched & dragged on a 2$^{nd}$ region, the controller 180 may control a 2$^{nd}$ time indicator 1714 to move [FIG. 17 (a)]. On the other hand, while the 2$^{nd}$ pointer 1704 is fixed to the 2$^{nd}$ region, if the 1$^{st}$ pointer 1702 is touched & dragged on the 1$^{st}$ region, the controller 180 may control a 1$^{st}$ time indicator 1712 to move [FIG. 17 (b)]. Moreover, if both of the 1$^{st}$ and 2$^{nd}$ pointers 1702 and 1704 are simultaneously touched & dragged on the 1$^{st}$ and 2$^{nd}$ regions, respectively, the controller 180 may control both of the 1$^{st}$ and 2$^{nd}$ time indicators 1712 and 1714 to move simultaneously.

According to one embodiment of the present invention, the above-described methods can be implemented as processor-readable codes in a program recorded medium. The processor-readable medium may include one of ROM, RAM, CD-ROM, magnetic tapes, floppy discs, optical data storage devices, and the like for example and also include one of carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen configured to display information;
a memory configured to store information; and
a controller configured to:
enter a video editing mode for editing video content in response to a first touch input to a first random location of the touchscreen and a second touch input to a second random location of the touchscreen;
control the touchscreen to display the video content and a progress bar for the displayed video content;
control the touchscreen to display a first time indicator and a second time indicator on the displayed progress bar;
control the touchscreen to display a first scene in a first region of the touchscreen at a first time corresponding to the first time indicator;
control the touchscreen to display a second scene in a second region of the touchscreen at a second time corresponding to the second time indicator;
control the touchscreen to display the first time indicator being moved to an updated first time along the progress bar in response to dragging of the first touch input and display the second time indicator being moved to an updated second time along the progress bar in response to dragging of the second touch input of the touchscreen,
wherein the first time indicator is moved by a first distance when the first touch input is dragged a first length along a straight path within the first region and starting from the first random location, and moved by a different second distance when the first touch input is dragged the same first length along a curved path within the first region and starting from the first random location;
wherein the second time indicator is moved by the first distance when the second touch input is dragged by the first length along a straight path within the second region and starting from the second random location, and moved by the different second distance when the second touch input is dragged the same first length along a curved path within the second region and starting from the second random location; and
cause the memory to store a video file corresponding to a portion of the video content starting from the updated first time and ending at the updated second time in response to an input command.

2. The mobile terminal of claim 1, wherein the controller is configured to:
terminate the video editing mode if the gap between the first and second time indicators is less than a preset value; and
not terminate the video editing mode if the gap between the first and second time indicators is greater than or equal to the preset value.

3. The mobile terminal of claim 1, wherein the first region and second region are different regions of the touchscreen.

4. The mobile terminal of claim 1, wherein the controller is further configured to control the touchscreen to move both the first time indicator and the second time indicator along the progress bar in response to detecting a touch input on the touchscreen that is dragged to a third region of the touchscreen.

5. The mobile terminal of claim 1, wherein the controller is further configured to control the touchscreen to:
display numerical values of the first time indicator and the second time indicator;
change the displayed first scene to a scene corresponding to a modified value of the first time indicator when the numerical value of the first time indicator is modified; and
change the displayed second scene to a scene corresponding to a modified value of the second time indicator when the numerical value of the second time indicator is modified.

6. The mobile terminal of claim 1, wherein the controller is further configured to control the touchscreen to replace the displayed video content with video content corresponding to the stored video file.

7. The mobile terminal of claim 1, wherein the controller is further configured to:
control the touchscreen to replace the displayed video content with video content corresponding to a remaining portion of the displayed video content with the exception of video content between the displayed first time indicator and the displayed second time indicator;
create new video content different from the replaced video content; and
cause the memory to store the created new video content.

8. The mobile terminal of claim 1, wherein the controller is further configured to:
determine whether the touchscreen is in portrait mode or landscape mode; and
control the touchscreen to:
vertically arrange the displayed first scene and the displayed second scene such that they are symmetrical to each other with reference to the displayed progress bar when it is determined that the touchscreen is in portrait mode; and
horizontally arrange the displayed first scene and the displayed second scene such that they are symmetrical to each other with reference to a center line of the touchscreen when it is determined that the touchscreen is in landscape mode.

9. A method of controlling a mobile terminal, the method comprising:
entering a video editing mode for editing video content in response to a first touch input to a first random location of the touchscreen and a second touch input to a second random location of the touchscreen;
displaying video content and a progress bar for the displayed video content on the touchscreen;
displaying a first time indicator and a second time indicator on the displayed progress bar;
displaying a first scene in a first region of the touchscreen at a first time corresponding to the first time indicator;
displaying a second scene in a second region of the touchscreen at a second time corresponding to the second time indicator;
moving the first time indicator to an updated first time along the progress bar in response to dragging of the first touch input and moving the second time indicator to an updated second time along the progress bar in response to dragging of the second touch input;
wherein the first time indicator is moved by a first distance when the first touch input is dragged a first length along a straight path within the first region and starting from the first random location, and moved by a different second distance when the first touch input is dragged the same first length along a curved path within the first region and starting from the first random location;
wherein the second time indicator is moved by the first distance when the second touch input is dragged by the first length along a straight path within the second region and starting from the second random location, and moved by the different second distance when the second touch input is dragged the same first length along a curved path within the second region and starting from the second random location; and
storing a video file corresponding to a portion of the video content starting from the updated first time and ending at the updated second time in response to an input command.

10. The method of claim 9, further comprising:
terminating the video editing mode if the gap between the first and second time indicators is less than a preset value; and
not terminating the video editing mode if the gap between the first and second time indicators is greater than or equal to the preset value.

11. The method of claim 9, wherein the first region and second region are different regions of the touchscreen.

12. The method of claim 9, further comprising moving both the first time indicator and the second time indicator along the progress bar in response to detecting a touch input on the touchscreen that is dragged to a third region of the touchscreen.

13. The method of claim 9, further comprising:
displaying numerical values of the first time indicator and the second time indicator on the touchscreen;
changing the displayed first scene to a scene corresponding to a modified value of the first time indicator when the numerical value of the first time indicator is modified; and
changing the displayed second scene to a scene corresponding to a modified value of the second time indicator when the numerical value of the second time indicator is modified.

14. The method of claim 9, further comprising:
replacing the displayed video content with video content corresponding to the stored video file.

15. The method of claim 9, further comprising:
replacing the displayed video content with video content corresponding to a remaining portion of the displayed video content with the exception of video content between the displayed first time indicator and the displayed second time indicator;
creating new video content different from the replaced video content; and
storing the created new video content.

16. The method of claim 9, further comprising:
determining whether the touchscreen is in portrait mode or landscape mode;
vertically arranging the displayed first scene and the displayed second scene such that they are symmetrical to each other with reference to the displayed progress bar when it is determined that the touchscreen is in portrait mode; and
horizontally arranging the displayed first scene and the displayed second scene such that they are symmetrical to each other with reference to a center line of the touchscreen when it is determined that the touchscreen is in landscape mode.

\* \* \* \* \*